US012686359B2

(12) United States Patent
Lee et al.

(10) Patent No.: US 12,686,359 B2
(45) Date of Patent: Jul. 21, 2026

(54) APPARATUS AND METHOD FOR CONTROLLING VEHICLE

(71) Applicants:HYUNDAI MOTOR COMPANY, Seoul (KR); KIA CORPORATION, Seoul (KR)

(72) Inventors: Ji Hye Lee, Hwaseong-si (KR); Seon Min Kim, Seoul (KR); Hyung Gyu Ra, Suwon-si (KR); Jeong Min Kim, Gwangmyeong-si (KR); Seok Gyu Kim, Seongnam-si (KR); Yong Ho Shin, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 381 days.

(21) Appl. No.: 18/492,195

(22) Filed: Oct. 23, 2023

(65) Prior Publication Data

US 2024/0391421 A1 Nov. 28, 2024

(30) Foreign Application Priority Data

May 26, 2023 (KR) ......................... 10-2023-0068545

(51) Int. Cl.
*B60R 25/24* (2013.01)
*B60R 25/102* (2013.01)
*B60R 25/30* (2013.01)

(52) U.S. Cl.
CPC ............ *B60R 25/24* (2013.01); *B60R 25/102* (2013.01); *B60R 25/30* (2013.01)

(58) Field of Classification Search
CPC ....... B60R 25/24; B60R 25/102; B60R 25/30; B60R 25/2009; B60R 25/243; B60R 25/252; B60R 25/34; B60R 25/00; H04L 9/3234; H04L 9/3231; H04L 2209/80; H04L 2209/84; H04W 84/18
USPC ...................................... 340/5.72, 7.58, 7.61
See application file for complete search history.

(56) References Cited

U.S. PATENT DOCUMENTS

| | | | | |
|---|---|---|---|---|
| 5,969,597 | A * | 10/1999 | Weigl ...................... | B60R 25/24 340/426.36 |
| 7,425,886 | B2 * | 9/2008 | Yoshii ..................... | B60R 25/24 340/5.31 |
| 8,089,343 | B2 * | 1/2012 | Yamaguchi ............. | B60R 25/24 340/5.31 |
| 8,620,490 | B2 * | 12/2013 | Lickfelt .................. | B60R 25/00 701/2 |
| 8,717,142 | B2 * | 5/2014 | Nagao ................ | G07C 9/00309 340/426.36 |
| 9,076,274 | B2 * | 7/2015 | Kamiya ................ | B60R 25/245 |

(Continued)

FOREIGN PATENT DOCUMENTS

| | | |
|---|---|---|
| JP | 2021066193 A | 4/2021 |
| KR | 102146182 A | 7/2020 |
| KR | 1020210075777 A | 6/2021 |

*Primary Examiner* — Nam V Nguyen
(74) *Attorney, Agent, or Firm* — MCDONNELL BOEHNEN HULBERT & BERGHOFF LLP

(57) ABSTRACT

An apparatus for controlling a vehicle includes a communication device that communicates with an authentication device of the vehicle, and a processor that searches for the authentication device inside the vehicle and prevents a guide message for authentication from being output when at least one authentication device found inside the vehicle.

20 Claims, 10 Drawing Sheets

(56) References Cited

U.S. PATENT DOCUMENTS

| | | | | |
|---|---|---|---|---|
| 9,902,368 | B2 * | 2/2018 | Maiwand | G07C 9/00896 |
| 9,976,322 | B2 * | 5/2018 | Lickfelt | B60C 5/005 |
| 10,315,621 | B2 | 6/2019 | Watanabe et al. | |
| 10,391,975 | B2 | 8/2019 | Meng | |
| 10,475,267 | B2 * | 11/2019 | DeLong | G07C 9/00309 |
| 10,685,515 | B2 * | 6/2020 | Hazebrouck | G01S 5/0294 |
| 10,919,497 | B1 | 2/2021 | DeLong et al. | |
| 10,959,042 | B2 * | 3/2021 | Jahn | H04W 4/021 |
| 11,691,595 | B2 * | 7/2023 | Nagai | H04M 11/00 |
| | | | | 340/5.61 |
| 11,849,329 | B2 * | 12/2023 | Sakamoto | H04W 12/069 |
| 12,103,493 | B2 * | 10/2024 | Nam | B60R 25/241 |
| 2009/0096578 | A1 * | 4/2009 | Ogino | B60R 25/245 |
| | | | | 340/5.72 |
| 2011/0114555 | A1 | 5/2011 | Coulson et al. | |
| 2016/0272152 | A1 * | 9/2016 | Iwata | G07C 9/00309 |

* cited by examiner

100

FIRST DIGITAL KEY     SECOND DIGITAL KEY     SMART KEY 31          32

| POWER APPLYING DEVICE | SPECIFICATION | SEARCH | POP-UP | WARNING SOUND | NOTE |
|---|---|---|---|---|---|
| SMART KEY | Key out/ ID out Warning | SMART KEY OR FIRST AND SECOND DIGITAL KEY PRESENCE | X | X | |
| | | SMART KEY & FIRST AND SECOND DIGITAL KEY ABSENCE | ⓐ "SMART KEY IS NOT INSIDE VEHICLE" ⓑ "SMART KEY AND DIGITAL KEY ARE NOT RECOGNIZED INSIDE VEHICLE" | (DOOR CLOSE) ○ | If) DIGITAL KEY REGISTERED STATE = ⓑ Else) UNREGISTERED STATE = ⓐ |
| FIRST DIGITAL KEY | Vehicle on Warning | SMART KEY OR FIRST AND SECOND DIGITAL KEY PRESENCE | X | X | POP-UP/BUZZER DELETION |
| | | SMART KEY & FIRST AND SECOND DIGITAL KEY ABSENCE | "SMART KEY AND DIGITAL KEY ARE NOT RECOGNIZED INSIDE VEHICLE" | | DIGITAL KEY REGISTERED STATE = ⓑ |
| SECOND DIGITAL KEY | | SMART KEY OR FIRST AND SECOND DIGITAL KEY PRESENCE | X | X | POP-UP/BUZZER DELETION |
| | | SMART KEY & FIRST AND SECOND DIGITAL KEY ABSENCE | "VEHICLE IS TURNED ON OR STARTED USING DIGITAL KEY" | (DOOR CLOSE) ○ | |
| FINGERPRINT | | SMART KEY OR FIRST AND SECOND DIGITAL KEY PRESENCE | X | X | |
| | | SMART KEY & FIRST AND SECOND DIGITAL KEY ABSENCE | "VEHICLE IS TURNED ON OR STARTED USING FINGERPRINT" | (DOOR CLOSE) ○ | |

FIG.4

| VEHICLE STATUS (STOPPED) | SCENARIO | SEARCH | POP-UP | START OPERATION |
|---|---|---|---|---|
| DIGITAL KEY UNREGISTERED/ FINGERPRINT UNREGISTERED + REMOTE START STATE | DOOR CLOSE, BRAKE PRESSING | SMART KEY PRESENCE | NONE | NORMAL START SWITCHING |
| | | SMART KEY ABSENCE | IGNITION CAN BE MAINTAINED ONLY WITH SMART KEY | REMOTE START STATE MAINTENANCE FOR UP TO 10 MINUTES (LINKED TO CCS REMOTE START TIME SETTING: 2 TO 10 MINUTES) |
| | SSB INPUT, REMOTE START STOP INPUT (SMART KEY, CCS) | – | NONE | IMMEDIATE STOP OF REMOTE START |
| DIGITAL KEY REGISTERED/ FINGERPRINT UNREGISTERED + REMOTE START STATE | DOOR CLOSE OR BRAKE PRESSING | SMART KEY OR FIRST DIGITAL KEY OR SECOND DIGITAL KEY PRESENCE | NONE | NORMAL START SWITCHING |
| | | SMART KEY OR FIRST DIGITAL KEY OR SECOND DIGITAL KEY ABSENCE | SMART KEY POSSESSION OR DIGITAL KEY AUTHENTICATION IS REQUIRED TO KEEP IGNITION RUNNING | REMOTE START STATE MAINTENANCE FOR UP TO 10 MINUTES (LINKED TO CCS REMOTE START TIME SETTING: 2 TO 10 MINUTES) |
| | SSB INPUT, REMOTE START STOP INPUT (SMART KEY, CCS) | – | NONE | IMMEDIATE STOP OF REMOTE START |
| DIGITAL KEY UNREGISTERED/ FINGERPRINT REGISTERED + REMOTE START STAT | DOOR CLOSE, BRAKE PRESSING | SMART KEY PRESENCE | NONE | NORMAL START SWITCHING |
| | | SMART KEY ABSENCE | SMART KEY POSSESSION OR FINGERPRINT AUTHENTICATION IS REQUIRED TO KEEP IGNITION RUNNING | REMOTE START STATE MAINTENANCE FOR UP TO 10 MINUTES (LINKED TO CCS REMOTE START TIME SETTING: 2 TO 10 MINUTES) |
| | SSB INPUT, REMOTE START STOP INPUT (SMART KEY, CCS) | – | NONE | IMMEDIATE STOP OF REMOTE START |
| DIGITAL KEY REGISTERED/ FINGERPRINT REGISTERED + REMOTE START STAT | DOOR CLOSE, BRAKE PRESSING | SMART KEY OR FIRST DIGITAL KEY OR SECOND DIGITAL KEY PRESENCE | NONE | NORMAL START SWITCHING |
| | | SMART KEY OR FIRST DIGITAL KEY OR SECOND DIGITAL KEY ABSENCE | SMART KEY POSSESSION, DIGITAL KEY OR FINGERPRINT AUTHENTICATION IS REQUIRED TO KEEP IGNITION RUNNING | REMOTE START STATE MAINTENANCE FOR UP TO 10 MINUTES (LINKED TO CCS REMOTE START TIME SETTING: 2 TO 10 MINUTES) |
| | SSB INPUT, REMOTE START STOP INPUT (SMART KEY, CCS) | – | NONE | IMMEDIATE STOP OF REMOTE START |

FIG.7

APPARATUS AND METHOD FOR CONTROLLING VEHICLE

CROSS-REFERENCE TO RELATED APPLICATION

This application claims the benefit of priority to Korean Patent Application No. 10-2023-0068545, filed in the Korean Intellectual Property Office on May 26, 2023, the entire contents of which are incorporated herein by reference.

TECHNICAL FIELD

The present disclosure relates to an apparatus for controlling a vehicle which outputs a message according to a device for authenticating a vehicle, and a method thereof.

BACKGROUND

A vehicle may perform a control command such as opening a vehicle door, opening a trunk, applying power, locking a vehicle, or the like by detecting a user's operation or possession of a smart key. Recently, there has been proposed a scheme of performing a control command through authentication using a digital key, a fingerprint, or the like along with a smart key.

However, when a door of a vehicle is opened or closed in a state in which the power of the vehicle is applied after being authenticated by a digital key or a fingerprint, a warning message is always output. In addition, in the remote start state, a warning is output based on a device of opening a vehicle door. When the vehicle door is opened with a digital key, a warning message that digital key authentication is required is output without switching to normal engine start even though there is another authentication device in the vehicle.

Therefore, even though there is another authentication device in a vehicle, a scheme of outputting a warning based only on a device that controls a door increases inconvenience to the user, so that there is a need to improve the function of outputting a warning.

SUMMARY

The present disclosure has been made to solve the above-mentioned problems occurring in the prior art while advantages achieved by the prior art are maintained intact.

An aspect of the present disclosure provides an apparatus and method for controlling a vehicle capable of preventing an unnecessary warning message required for authentication from being output when an authentication device found in the vehicle.

Another aspect of the present disclosure provides an apparatus and method for controlling a vehicle capable of searching for all authentication devices in the vehicle when a door state is changed while vehicle power is applied, preventing a warning message from being output when at least one authentication device is found, and outputting a guide message according to an authentication device used to apply power and whether a digital key is registered when any authentication devices are not found in the vehicle.

Still another aspect of the present disclosure provides an apparatus and method for controlling a vehicle capable of searching for all authentication devices in the vehicle when a door is closed or a brake is pressed in a remote start state of the vehicle, preventing a warning message from being output when at least one authentication device is found, and outputting a guide message based on an authentication device registered in the vehicle when any authentication devices are not found in the vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes a communication device that communicates with an authentication device of the vehicle, and a processor that searches for the authentication device inside the vehicle and prevents a guide message for authentication from being output when at least one authentication device is found inside the vehicle.

According to an embodiment, the processor may search for the authentication device inside the vehicle when determining that a state of a door is changed while power is applied to the vehicle, and output the guide message according to the authentication device used to apply the power and whether the authentication device used to apply the power is registered in the vehicle when the authentication device is not found inside the vehicle.

According to an embodiment, the processor may determine that the authentication device is not found inside the vehicle, and output a message informing that a smart key and a first digital key are not recognized when the first digital key is registered in the vehicle, and wherein the authentication device used to apply the power includes the smart key and the first digital key.

According to an embodiment, the processor may determine that the authentication device is not found inside the vehicle, and output a message informing that the power is applied by using a second digital key or a fingerprint when the authentication device used to apply the power includes the second digital key or the fingerprint.

According to an embodiment, the processor may search for the authentication device inside the vehicle when determining a remote start state and at least one of a door closed state of the vehicle, a brake pressed state, or a combination thereof, and output the guide message according to the authentication device registered in the vehicle when the authentication device is not found inside the vehicle.

According to an embodiment, the processor may output a message informing that a smart key, a first digital key, a second digital key, or a fingerprint is required as an authentication device for maintaining engine running when it is determined that the authentication device is not found inside the vehicle, and the authentication device registered in the vehicle includes at least one of the first digital key, the second digital key or a combination thereof, and the fingerprint.

According to an embodiment, the processor may output a message informing that a smart key or a fingerprint is required as the authentication device for maintaining engine running when it is determined that the authentication device is not found inside the vehicle and the authentication device registered in the vehicle includes a fingerprint.

According to an embodiment, the processor may output a message informing that a smart key, a first digital key or a second digital key is required as an authentication device for maintaining engine running when it is determined that the authentication device is not found inside the vehicle, and the authentication device registered in the vehicle includes at least one of the first digital key, the second digital key or a combination thereof.

According to an embodiment, the processor may output a message informing that a smart key is required as the authentication device for maintaining engine running when it is determined that the authentication device is not found inside the vehicle and the authentication device registered in the vehicle does not exist.

According to an embodiment, the authentication device communicating with the communication device may include at least one of a smart key, a first digital key, a second digital key, or a combination thereof.

According to an embodiment, the communication device may communicate with the first digital key through at least one of near field communication (NFC), Bluetooth low energy, ultra wideband (UWB) communication, or a combination thereof.

According to an embodiment, the processor may determine that the second digital key is found inside the vehicle when the second digital key is provided on a wireless charging device.

According to another aspect of the present disclosure, a method of controlling a vehicle includes searching for an authentication device inside the vehicle, and preventing a guide message for authentication from being output when at least one authentication device is found inside the vehicle.

According to an embodiment, the method may further include searching for the authentication device inside the vehicle when determining that a state of a door is changed while power is applied to the vehicle, and outputting the guide message according to the authentication device used to apply the power and whether the authentication device used to apply the power is registered in the vehicle when the authentication device is not found inside the vehicle.

According to an embodiment, the method may further include determining that the authentication device is not found inside the vehicle, and outputting a message informing that a smart key and a first digital key are not recognized when the first digital key is registered in the vehicle, wherein the authentication device used to apply the power includes the smart key and the first digital key.

According to an embodiment, the method may further include determining that the authentication device is not found inside the vehicle, and outputting a message informing that the power is applied by using a second digital key or a fingerprint when the authentication device used to apply the power includes the second digital key or the fingerprint.

According to an embodiment, the method may further include searching for the authentication device inside the vehicle when determining a remote start state and at least one of a door closed state of the vehicle, a brake pressed state, or a combination thereof, and outputting the guide message according to the authentication device registered in the vehicle when the authentication device is not found inside the vehicle.

According to an embodiment, the method may further include outputting a message informing that a smart key, a first digital key, a second digital key, or a fingerprint is required as an authentication device for maintaining engine running when it is determined that the authentication device is not found inside the vehicle, and the authentication device registered in the vehicle includes at least one of the first digital key, the second digital key or a combination thereof, and the fingerprint.

According to an embodiment, the method may further include outputting a message informing that a smart key or a fingerprint is required as the authentication device for maintaining engine running when it is determined that the authentication device is not found inside the vehicle and the authentication device registered in the vehicle includes a fingerprint.

According to an embodiment, the method may further include outputting a message informing that a smart key, a first digital key or a second digital key is required as an authentication device for maintaining engine running when it is determined that the authentication device is not found inside the vehicle, and the authentication device registered in the vehicle includes at least one of the first digital key, the second digital key or a combination thereof.

BRIEF DESCRIPTION OF THE DRAWINGS

The above and other objects, features and advantages of the present disclosure will be more apparent from the following detailed description taken in conjunction with the accompanying drawings:

FIG. 4 is a schematic diagram illustrating a message output scheme according to a start-up authentication device according to an embodiment of the present disclosure;

FIG. 7 is a diagram schematically illustrating a message output scheme according to an authentication device registered in a vehicle according to an embodiment of the present disclosure;

DETAILED DESCRIPTION

Figure 1:
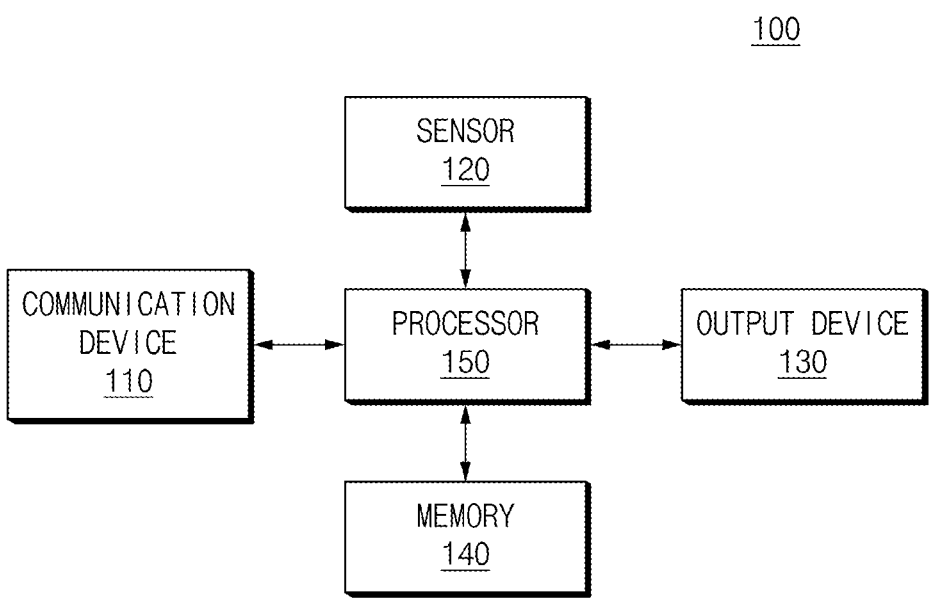
FIG. 1 is a block diagram illustrating the configuration of an apparatus for controlling a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an apparatus for controlling a vehicle according to an embodiment of the present disclosure.

As shown in FIG. 1, an apparatus 100 for controlling a vehicle according to an embodiment of the present disclosure may include a communication device 110, a sensor 120, an output device 130, a memory 140, and a processor 150.

The communication device 110 may communicate with an authentication device of a vehicle.

According to an embodiment, the communication device 110 may communicate with a smart key. In this case, the smart key may include a FOB key that controls unlocking or locking of a vehicle door, applies power to an electronic device, or performs authentication for remote starting. According to an embodiment, the communication device 110 may transmit an LF signal to the smart key through LF communication, and may receive an RF signal in response to the LF signal transmitted from the smart key through RF communication.

According to another embodiment, the communication device 110 may communicate with a first digital key. According to an embodiment, the communication device 110 may communicate with the first digital key through at least one of near field communication (NFC), Bluetooth low energy (BLE), ultra wideband (UWB) communication, or a combination thereof. In this case, the first digital key may be stored through an application of a portable terminal (smart terminal), and control the unlocking or locking of a vehicle door by using the first digital key with only possession of the portable terminal, or apply power to an electronic device or perform authentication for remote starting.

According to another embodiment, the communication device 110 may communicate with a second digital key. According to an embodiment, the communication device 110 may communicate with the second digital key through near field communication (NFC). In this case, the second digital key may be stored through an application of a portable terminal (smart terminal), and when the portable terminal is brought into contact with an external door handle, the second digital key may be used to control the unlocking or locking of the vehicle door, or when provided on a wireless charging device in the vehicle, the second digital key may perform authentication to apply power to the electronic device.

The sensor 120 may include at least one sensor for detecting a vehicle state, and according to an embodiment, may detect a door state of the vehicle and a brake pressing state. According to an embodiment, the sensor 120 may include a door sensor that detects the opening or closing of a door of the vehicle and a brake pedal sensor that detects a brake pressure level.

The output device 130 may output an image or sound under control of the processor 150. According to an embodiment, the output device 130 may be implemented as a display device or a sound output device. In this case, the display device may include a navigation display device, a HUD, a cluster, and the like, and may be implemented as a display device that employs a liquid crystal display (LCD) panel, a light emitting diode (LED) panel, an organic light emitting diode (OLED) panel, a plasma display panel (PDP), and the like. The liquid crystal display may include a thin film transistor liquid crystal display (TFT-LCD). The output device 130 may be integrally implemented by a touch screen panel (TSP).

The memory 140 may store at least one algorithm for performing operations or executions of various commands for the operation of an apparatus for controlling a vehicle according to an embodiment of the present disclosure. According to an embodiment, the memory 140 may store at least one command executed by the processor 150, and the command may cause an apparatus for controlling a device of the present disclosure to operate. The memory 140 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The processor 150 may be implemented with various processing devices in which a semiconductor chip capable of performing operations or executions of various commands is embedded, and may control operations of an apparatus for controlling a vehicle according to an embodiment of the present disclosure. The processor 150 may be electrically connected to the communication device 110, the sensor 120, the output device 130, and the memory 140 through a wired cable or various circuits to transmit an electrical signal including a control command and the like, and may execute operations or data processing for control and/or communication. The processor 150 may include at least one of a central processing device, an application processor, a communication processor (CP), or a combination thereof.

When the processor 150 determines that the power of the vehicle is applied and the state of the door of the vehicle is changed, the processor 150 may search for an authentication device inside the vehicle. According to an embodiment, when the door of the vehicle is changed from a closed state to an open state while power is applied to the vehicle, the processor 150 may search for an authentication device inside the vehicle.

According to an embodiment, the processor 150 may calculate the distance to the authentication device by using the time at which the communication device 110 receives a signal from the authentication device after the signal is transmitted from the communication device 110 to the authentication device, and based on the distance, the processor may search for the authentication device inside the vehicle. The processor 150 may determine that the authentication device is located inside the vehicle when the distance from the authentication device is less than or equal to a threshold distance. In this case, the threshold distance may be set to different values according to the type of authentication device. When the authentication device is located inside the vehicle, the processor 150 may determine that the authentication device found inside the vehicle, and may not output a guide message for authentication when at least one authentication device found inside the vehicle. In this case, the guide message for authentication may include a message for guiding the authentication device necessary for vehicle control. For a more detailed description, refer to FIG. 2.

Figure 2:
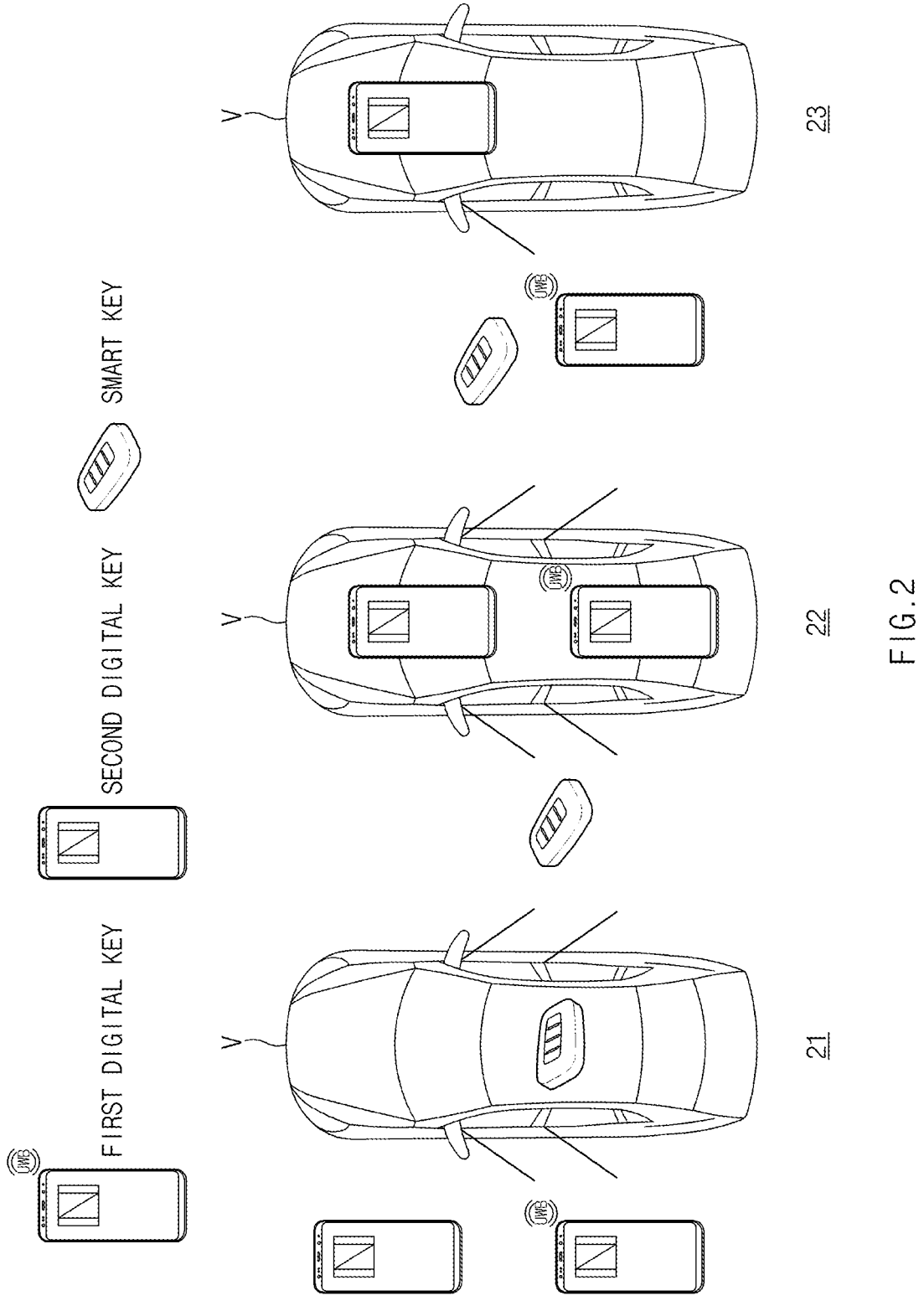
FIGS. 2 and 3 are diagrams schematically illustrating a message output scheme according to the location of an authentication device according to an embodiment of the present disclosure.
Figure 3:
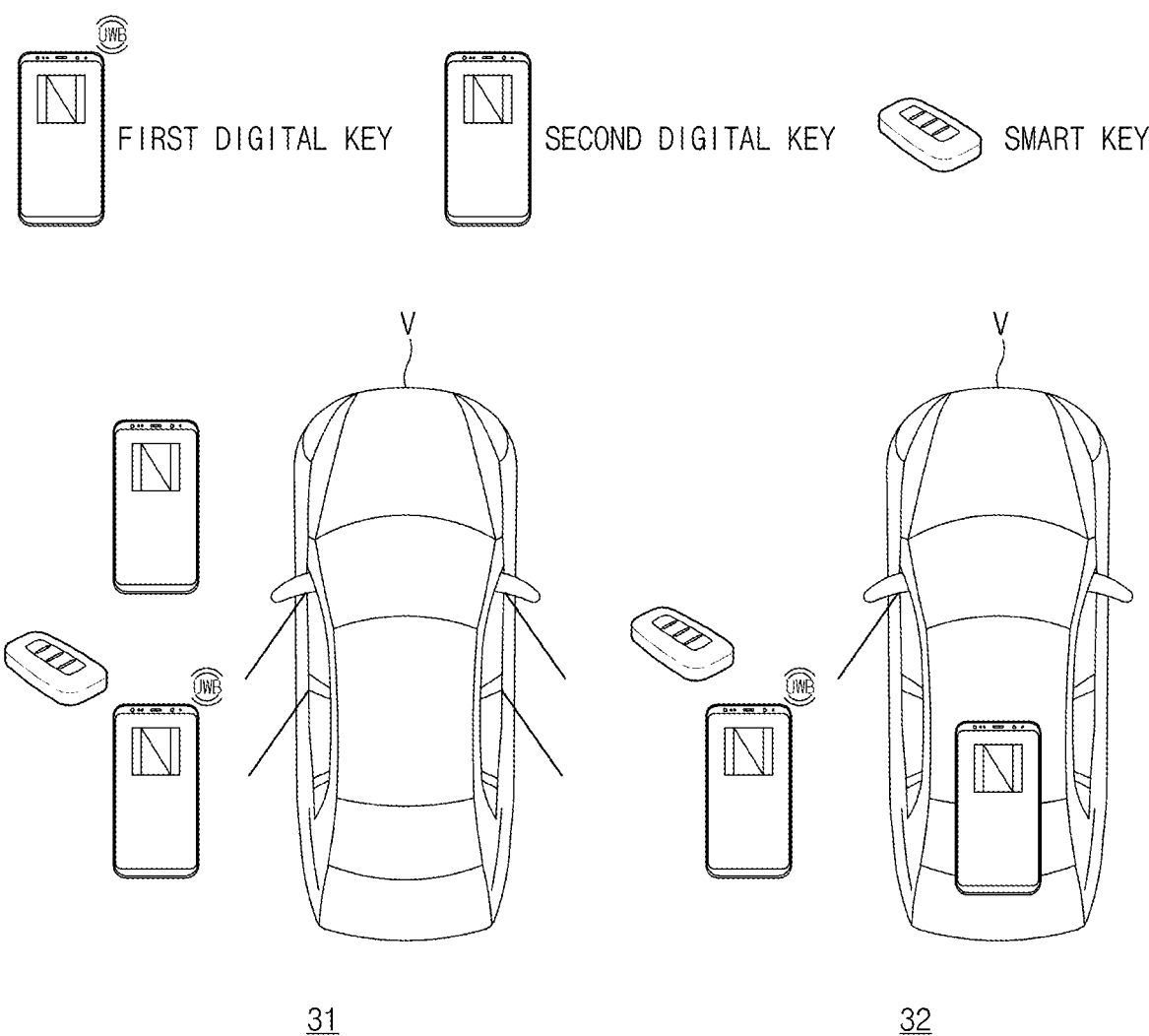

FIGS. 2 and 3 are diagrams schematically illustrating a message output scheme according to the location of an authentication device according to an embodiment of the present disclosure.

As indicated with reference numeral 21 of FIG. 2, when the processor 150 determines that power is applied to a vehicle V and all door states of the vehicle V are changed, the processor 150 may search for an authentication device inside the vehicle V. When the smart key is located inside the vehicle V, the processor 150 may determine that the smart key is found inside the vehicle V and may not output a guide message for authentication.

As indicated with reference numeral 22 in FIG. 2, when it is determined that power is applied to the vehicle V and all door states of the vehicle V are changed, the processor 150 may search for the authentication device inside the vehicle V. When the first digital key is located inside the vehicle, the processor 150 may determine that the first digital key is found inside the vehicle V and when the second digital key is provided above the wireless charging device, the processor 150 may determine that the second digital key is found inside the vehicle V and prevent a guide message for authentication from being output.

As indicated with reference numeral 23 in FIG. 2, when it is determined that power is applied to the vehicle V and the state of the driver's seat door of the vehicle V is changed, the processor 150 may search for an authentication device inside the vehicle V. When the second digital key is provided above a wireless charging device, the processor 150 may determine that the second digital key found inside the vehicle V and may not output a guide message for authentication. According to an embodiment of the present disclosure, the wireless charging device may be provided near the driver's seat and the passenger's seat.

Meanwhile, according to an embodiment, when the processor 150 determines that power is applied to the vehicle V and the state of the door of the vehicle V is changed, and searches for an authentication device inside the vehicle V so that the authentication device cannot be found inside the vehicle V, the processor 150 may allow a guide message to be output according to the authentication device used to apply power and whether the authentication device used to apply power is registered in the vehicle. For more detailed description, refer to FIGS. 3 and 4.

As indicated with reference numeral 31 in FIG. 3, when the processor 150 determines that power is applied to the vehicle V and the state of the driver's seat door of the vehicle V is changed, the processor 150 may search for an authentication device inside the vehicle V. When it is determined that any authentication devices are not found inside the vehicle V and the processor 150 may allow a guide message to be output according to the authentication device used to apply power and whether the authentication device used to apply power is registered in the vehicle V. For a more detailed description, refer to FIG. 4.

As indicated with reference numeral 32 in FIG. 3, when determining that power is applied to the vehicle V and the state of the driver's seat door of the vehicle V is changed, the processor 150 may search for an authentication device existing inside the vehicle V. Because the processor 150 determines that the second digital key is found inside the vehicle when the second digital key is provided on the wireless charging device (see reference numeral 23 in FIG. 2), the processor 150 may determine that the second digital key is not found inside the vehicle V when the second digital key is separated from an upper portion of the wireless charging device. When the authentication device is not found inside the vehicle V, the processor 150 outputs a guide message according to the authentication device used to apply power and whether or not the authentication device used to apply power is registered in the vehicle. For a more detailed description, refer to FIG. 4.

FIG. 4 is a schematic diagram illustrating a message output scheme according to a start-up authentication device according to an embodiment of the present disclosure.

As shown in FIG. 4, when the processor 150 determines that the authentication device used to apply power is a smart key and the authentication device is not found inside the vehicle, the processor 150 may determine that the smart key does not exist inside the vehicle after being used for applying power. When the authentication device is not found inside the vehicle, the processor 150 may determine that the authentication device is moved to the outside of the vehicle by the user while the door state is changed (from a closed state to an open state).

According to an embodiment, the processor 150 may determine whether the digital key is registered in the vehicle. When the digital key is not registered in the vehicle, the processor 150 may output a message informing that the smart key does not exist in the vehicle. Meanwhile, when the digital key is registered in the vehicle, the processor 150 may output a message informing that the smart key and the digital key are not recognized inside the vehicle. In addition, the processor 150 may output a warning sound (such as a buzzer, for example) when the door is changed to a closed state after determining that the authentication device is not found inside the vehicle.

When it is determined that the authentication device used to apply power is the first digital key and the authentication device is not found inside the vehicle, the processor 150 may determine that the authentication device does not exist inside the vehicle even after the first digital key is used to apply power. When the authentication device present inside the vehicle is not found, the processor 150 may determine that the authentication device is moved to the outside of the vehicle by the user while the door state is changed (changed from a closed state to an open state).

According to an embodiment, because the first digital key is used to apply power, the processor 150 may determine that the first digital key is registered in the vehicle and output a message informing that the smart key and the digital key are not recognized inside the vehicle. In addition, the processor 150 may output a warning sound (such as a buzzer, for example) when the door is changed to a closed state after determining that the authentication device is not found inside the vehicle.

When it is determined that the authentication device used to apply power is the second digital key and the authentication device is not found inside the vehicle, the processor 150 may determine that the second digital key is not located over the wireless charging device or exists outside the vehicle after the second digital key is used to apply power. When the authentication device present inside the vehicle is not found, the processor 150 may determine that the authentication device is moved to the outside of the vehicle by the user or is separated from the wireless charging device while the door state is changed (changed from a closed state to an open state).

According to an embodiment, because the second digital key is used to apply power and is not found inside the vehicle, the processor 150 may output a message informing that the power of the vehicle is turned on or the ignition is turned on using the digital key. In addition, the processor 150 may output a warning sound (buzzer) when the door is changed to a closed state after determining that the authentication device is not found inside the vehicle.

When it is determined that the authentication device present inside the vehicle is not found and the authentication device used to apply power is a fingerprint, the processor 150 may output a message informing that the vehicle power is applied using the fingerprint or the ignition is turned on. In addition, the processor 150 may output a warning sound (buzzer) when the door is changed to a closed state after determining that the authentication device is not found inside the vehicle.

When determining a remote start state and at least one of a door closed state of the vehicle, a brake pressed state, or a combination thereof, the processor 150 may search for an authentication device inside the vehicle, and not output any guide messages for authentication when at least one authentication device is found. For a more detailed description, refer to FIG. 5.

Figure 5:
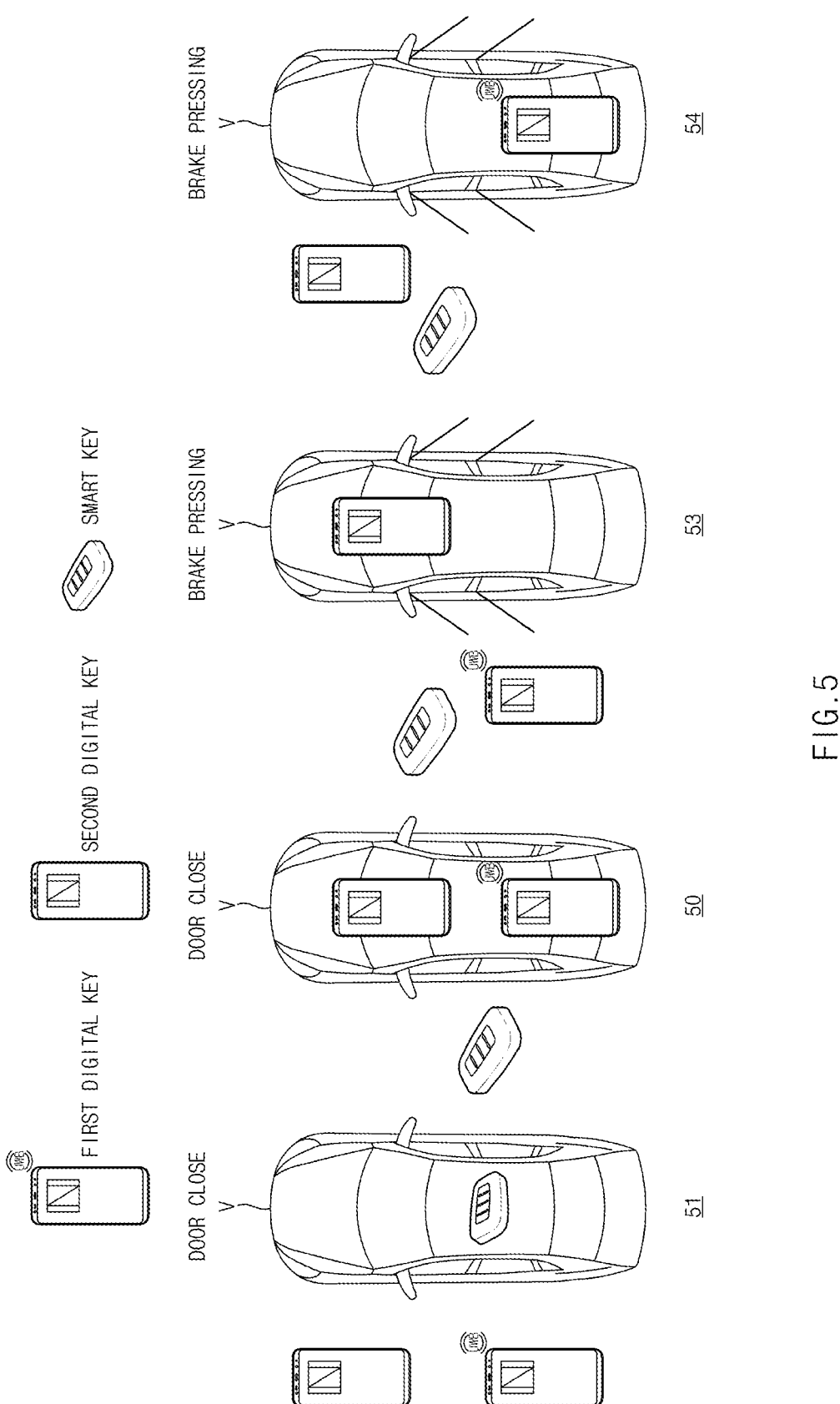
FIGS. 5 and 6 are diagrams schematically illustrating a message output scheme according to the location of an authentication device according to another embodiment of the present disclosure.
Figure 6:
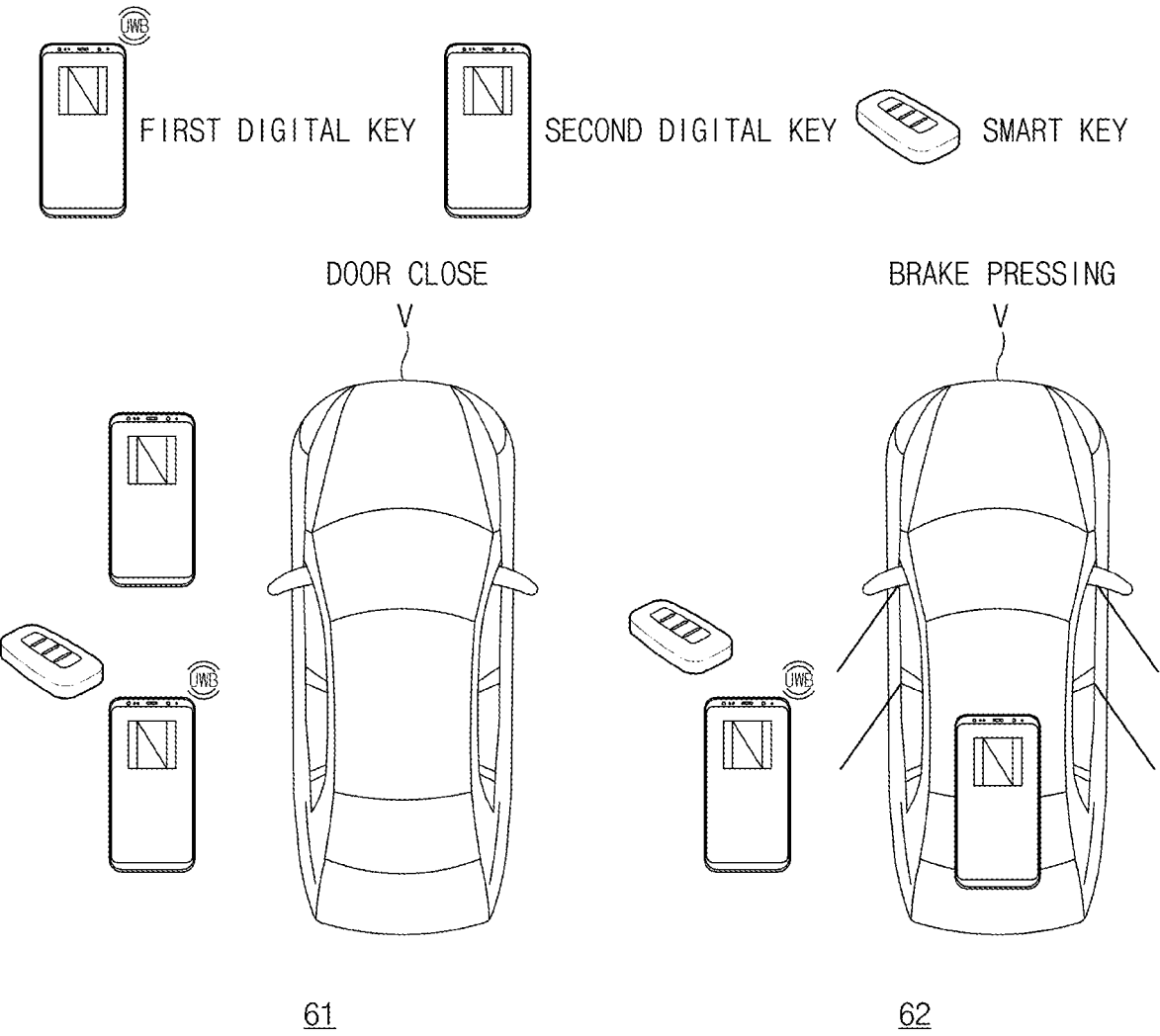

FIGS. 5 and 6 are diagrams schematically illustrating a message output scheme according to the location of an authentication device according to another embodiment of the present disclosure.

As indicated with reference numeral 51 in FIG. 5, the processor 150 may search for an authentication device inside the vehicle V when the vehicle V is in a remote start state and the door of the vehicle is in a closed state. When the smart key is located inside the vehicle V, the processor 150 may determine that the smart key is found inside the vehicle V and may not output a guide message for authentication.

As indicated with reference numeral 52 in FIG. 5, the processor 150 may search for an authentication device inside the vehicle V when the vehicle V is in a remote start state and the vehicle door is in a closed state. When the first digital key is located inside the vehicle, the processor 150 determines that the first digital key is found inside the vehicle V, and when the second digital key is provided above the wireless charging device, the processor 150 may determine that the second digital key is found inside the vehicle V and may not output a guide message for authentication.

As indicated with reference numeral 53 of FIG. 5, the processor 150 may search for an authentication device inside the vehicle V when the vehicle V is in a remote start state and the brake is pressed. When the second digital key is provided above the wireless charging device, the processor 150 may determine that the second digital key is found inside the vehicle V and may not output a guide message for authentication.

As indicated with reference numeral 54 in FIG. 5, the processor 150 may search for an authentication device inside the vehicle V when the vehicle V is in a remote start state and the brake is pressed. When the first digital key is located inside the vehicle V, the processor 150 may determine that the first digital key is found inside the vehicle V and may not output a guide message for authentication.

Meanwhile, according to an embodiment, when determining the remote start state and at least one of a door closed state of the vehicle, a brake pressed state or a combination thereof and searching for an authentication device inside the vehicle, the processor 150 may output a guide message according to the authentication device registered in the vehicle when any authentication device are not found inside the vehicle. For a more detailed description, refer to FIG. 6.

As indicated with reference numeral 61 in FIG. 6, the processor 150 may search for an authentication device inside the vehicle V when the vehicle V is in a remote start state and the vehicle door is in a closed state. When it is determined that the authentication device is not found inside the vehicle V, the processor 150 may output a guide message according to the authentication device registered in the vehicle. For a more detailed description, refer to FIG. 7.

As indicated with reference numeral 62 in FIG. 6, the processor 150 may search for an authentication device inside the vehicle V when the vehicle V is in a remote start state and the brake is pressed. Because the processor 150 may determine that the second digital key is found inside the vehicle when the second digital key is provided on the wireless charging device (see reference numeral 23 in FIG. 2), the processor 150 may determine that the second digital key is not found inside the vehicle V when the second digital key is separated from an upper portion of the wireless charging device. The processor 150 may output a guide message according to the authentication device registered in the vehicle when the authentication device is not found inside the vehicle V. For a more detailed description, refer to FIG. 7.

FIG. 7 is a diagram schematically illustrating a message output scheme according to an authentication device registered in a vehicle according to an embodiment of the present disclosure.

As shown in FIG. 7, when it is determined that the vehicle V is in a remote start state and in at least one of a door closed state, a brake pressed state or a combination thereof, the processor 150 may search for an authentication device inside the vehicle V.

When at least one authentication device inside the vehicle V is found, the processor 150 may not output a guide message for authentication and may switch from the remote start state to a normal start state.

Meanwhile, the processor 150 may determine the authentication device registered in the vehicle when determining that the authentication device is not found inside the vehicle.

According to an embodiment, when the authentication device registered in the vehicle includes at least one of the first digital key, the second digital key or a combination thereof, and the fingerprint, the processor 150 may output a message informing that a first digital key, a second digital key, a smart key, or a fingerprint is required as an authentication device for maintaining engine running. For example, the processor 150 may output a message saying "To keep the engine running, possession of a smart key or digital key or fingerprint authentication is required".

According to an embodiment, when the authentication device registered in the vehicle include a fingerprint, the processor 150 may output a message informing that a smart key or a fingerprint is required as an authentication device for maintaining engine running. For example, the processor 150 may output a message saying "To keep the engine running, possession of a smart key or fingerprint authentication is required".

According to an embodiment, the processor 150 may output a message informing that at least one of the first digital key, the second digital key, or a combination thereof is required by an authentication device registered in the vehicle. For example, the processor 150 may output a message saying "To keep the engine running, possession of a smart key or digital key authentication is required".

According to an embodiment, the processor 150 may output a message informing that a smart key is required as an authentication device when the authentication device is not registered in the vehicle. For example, the processor 150 may output a message saying "To keep the engine running, possession of a smart key is required".

When the message is output, the processor 150 may maintain remote startup for a remote startup state maintenance time (2 to 10 minutes) set by the user.

In addition, the processor 150 immediately stops remote starting without outputting a message for authentication when a start and stop button (SSB) is input by a user or a remote start stop button is input.

Figure 8:
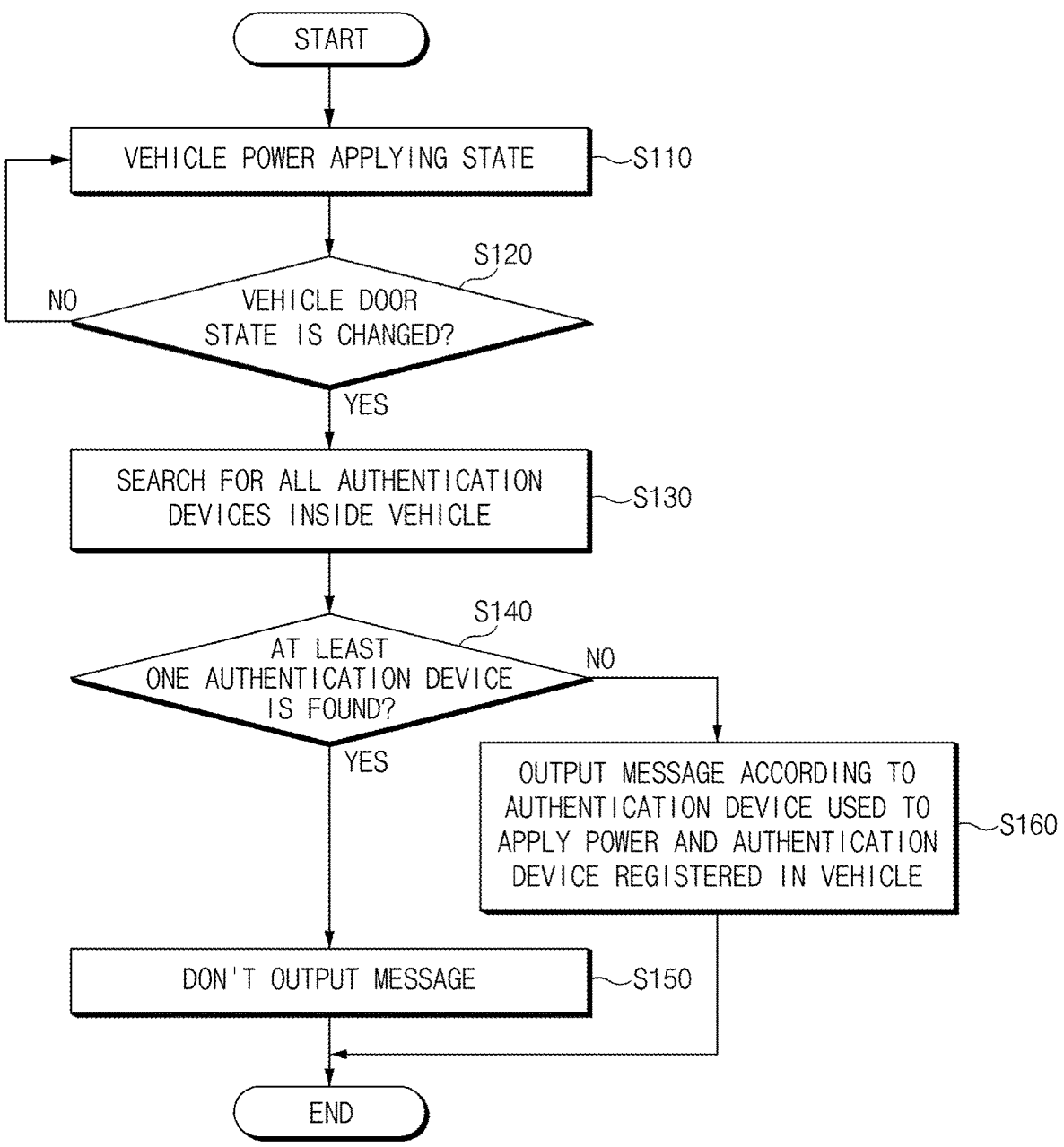
FIGS. 8 and 9 are diagrams illustrating a method of controlling a vehicle according to an embodiment of the present disclosure.
Figure 9:
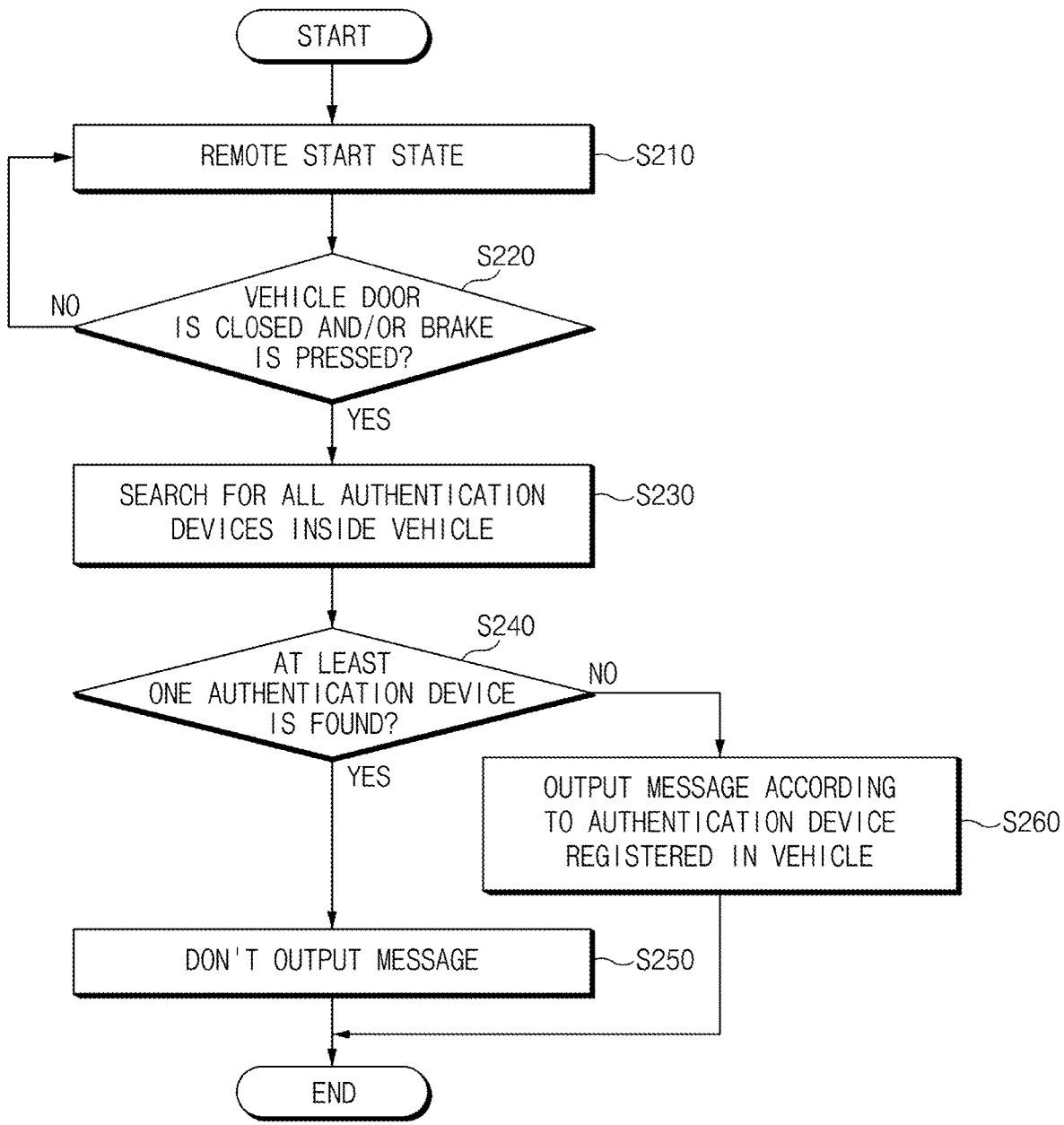

FIGS. 8 and 9 are diagrams illustrating a method of controlling a vehicle according to an embodiment of the present disclosure.

As shown in FIG. 8, in S110, the processor 150 may determine that power is applied to the vehicle. In S120, the processor 150 may determine whether power is applied to the vehicle and whether the state of the door of the vehicle is changed.

When it is determined in S120 that the state of the door of the vehicle is changed, the processor 150 may search for an authentication device inside the vehicle in S130. According to an embodiment, in S130, the processor 150 may search for an authentication device inside the vehicle when the door of the vehicle is changed from a closed state to an open state while power is applied to the vehicle.

In S140, the processor 150 may determine whether at least one authentication device is found inside the vehicle.

The processor 150 may determine in S140 that the authentication device is found inside the vehicle when at least one authentication device is located inside the vehicle, and in S150, may not output a guide message for authentication when at least one authentication device is found inside the vehicle. For a more detailed description, refer to FIG. 2.

According to the embodiment, in S150, when it is determined that power is applied to the vehicle V and all door states of the vehicle V are changed, the processor 150 may search for an authentication device inside the vehicle V. When the smart key is located inside the vehicle V, the processor 150 may determine that the smart key is found inside the vehicle V, and may not output a guide message for authentication.

According to another embodiment, in S150, when determining that the power is applied to the vehicle V and all door states of the vehicle V are changed, the processor 150 may search for an authentication device inside the vehicle V. The processor 150 may determine that the first digital key is found inside the vehicle when the first digital key is located inside the vehicle, and when the second digital key is provided above the wireless charging device, the processor 150 may determine that the second digital key is found inside the vehicle V and may not output a guide message for authentication.

According to another embodiment when it is determined that power is applied to the vehicle V and the state of the driver's seat door of the vehicle V is changed, in S150, the processor 150 may search for an authentication device inside the vehicle V. When the second digital key is provided above the wireless charging device, the processor 150 may determine that the second digital key is found inside the vehicle V and may not output a guide message for authentication.

Meanwhile, according to an embodiment, when the processor 150 determines that power is applied to the vehicle V and the state of the door of the vehicle V is changed, and searches for an authentication device inside the vehicle V so that the authentication device cannot be found inside the vehicle V in S140, in S160, the processor 150 may allow a guide message to be output according to the authentication device used to apply power and whether the authentication device used to apply power is registered in the vehicle. For more detailed description, refer to FIG. 4.

According to the embodiment, in S160, when the processor 150 determines that the authentication device used to apply power is a smart key and the authentication device is not found inside the vehicle, the processor 150 may determine that the smart key does not exist inside the vehicle after being used for applying power. When the authentication device is not found inside the vehicle, the processor 150 may determine that the authentication device is moved to the outside of the vehicle by the user while the door state is changed (from a closed state to an open state).

According to an embodiment, the processor 150 may determine whether the digital key is registered in the vehicle. When the digital key is not registered in the vehicle, the processor 150 may output a message informing that the smart key does not exist in the vehicle. Meanwhile, when the digital key is registered in the vehicle, the processor 150 may output a message informing that the smart key and the digital key are not recognized inside the vehicle. In addition, the processor 150 may output a warning sound (buzzer) when the door is changed to a closed state after determining that the authentication device is not found inside the vehicle.

According to another embodiment, in S160, when it is determined that the authentication device used to apply power is the first digital key and the authentication device is not found inside the vehicle, the processor 150 may determine that the authentication device does not exist inside the vehicle even after the first digital key is used to apply power. When the authentication device present inside the vehicle is not found, the processor 150 may determine that the authentication device is moved to the outside of the vehicle by the user while the door state is changed (changed from a closed state to an open state).

According to an embodiment, because the first digital key is used to apply power, the processor 150 may determine that the first digital key is registered in the vehicle and output a message informing that the smart key and the digital key are not recognized inside the vehicle. In addition, the processor 150 may output a warning sound (such as a buzzer, for example) when the door is changed to a closed state after determining that the authentication device is not searched inside the vehicle.

According to another embodiment, in S160, when it is determined that the authentication device used to apply power is the second digital key and the authentication device is not found inside the vehicle, the processor 150 may determine that the second digital key is not located over the wireless charging device or exists outside the vehicle after the second digital key is used to apply power. When the authentication device present inside the vehicle is not found, the processor 150 may determine that the authentication device is moved to the outside of the vehicle by the user or is separated from the wireless charging device while the door state is changed (changed from a closed state to an open state).

According to an embodiment, because the second digital key is used to apply power and is not found inside the vehicle, the processor 150 may output a message informing that the power of the vehicle is turned on or the ignition is turned on using the digital key. In addition, the processor 150 may output a warning sound (such as a buzzer, for example) when the door is changed to a closed state after determining that the authentication device is not found inside the vehicle.

According to another embodiment, in S160, when it is determined that the authentication device present inside the vehicle is not found and the authentication device used to apply power is a fingerprint, the processor 150 may output a message informing that the vehicle power is applied using the fingerprint or the ignition is turned on. In addition, the processor 150 may output a warning sound (such as a buzzer, for example) when the door is changed to a closed state after determining that the authentication device is not found inside the vehicle.

As shown in FIG. 9, in S210, the processor 150 may determine that the vehicle is in a remote start state.

In S220, when the vehicle is in a remote start state, the processor 150 may determine whether at least one of a door closed state of the vehicle, a brake pressed state, or a combination thereof.

When it is determined at least one of a door closed state of the vehicle, a brake pressed state, or a combination thereof, in S230, the processor 150 may search for an authentication device inside the vehicle.

In S240, the processor 150 may determine whether at least one authentication device is found inside the vehicle.

When it is determined that at least one authentication device is found inside the vehicle, in S250, the processor 150 may not output a guide message for authentication and switch a remote start state to a normal start state. For a more detailed description, refer to FIG. 5.

According to an embodiment, in S250, the processor 150 may search for an authentication device inside the vehicle V when the vehicle V is in a remote start state and the door of the vehicle is in a closed state. When the smart key is located inside the vehicle V, the processor 150 may determine that the smart key is found inside the vehicle V, and may not output a guide message for authentication.

According to another embodiment, in S250, the processor 150 may search for an authentication device inside the vehicle V when the vehicle V is in a remote start state and the vehicle door is in a closed state. When the first digital key is located inside the vehicle, the processor 150 may determine that the first digital key is found inside the vehicle V, and when the second digital key is provided above the wireless charging device, the processor 150 may determine that the second digital key is found inside the vehicle V, and may not output a guide message for authentication.

According to another embodiment in S250, the processor 150 may search for an authentication device inside the vehicle V when the vehicle V is in a remote start state and the brake is pressed. When the second digital key is provided above the wireless charging device, the processor 150 may determine that the second digital key is found inside the vehicle V and may not output a guide message for authentication.

According to another embodiment in S250, the processor 150 may search for an authentication device inside the vehicle V when the vehicle V is in a remote start state and the brake is pressed. When the first digital key is located inside the vehicle V, the processor 150 may determine that the first digital key is found inside the vehicle V and may not output a guide message for authentication.

Meanwhile, when determining the remote start state and at least one of a door closed state of the vehicle, a brake pressed state or a combination thereof and searching for an authentication device inside the vehicle in S240, in S260, the processor 150 may output a guide message according to the authentication device registered in the vehicle when any authentication device are not found inside the vehicle. For a more detailed description, refer to FIG. 7.

According to an embodiment, in S260, when the authentication device registered in the vehicle includes at least one of the first digital key, the second digital key or a combination thereof, and the fingerprint, the processor 150 may output a message informing that a first digital key, a second digital key, a smart key, or a fingerprint is required as an authentication device for maintaining engine running. For example, the processor 150 may output a message saying "To keep the engine running, possession of a smart key or digital key or fingerprint authentication is required".

According to an embodiment, in S260, when the authentication device registered in the vehicle includes a fingerprint, the processor 150 may output a message informing that a smart key or a fingerprint is required as an authentication device for maintaining engine running. For example, the processor 150 may output a message saying "To keep the engine running, possession of a smart key or fingerprint authentication is required".

According to an embodiment, in S260, the processor 150 may output a message informing that the first digital key or the second digital key, is required as an authentication device for keeping the engine running when the authentication device registered in the vehicle is at least one of the first digital key or the second digital key, a combination thereof. For example, the processor 150 may output a message saying "To keep the engine running, possession of a smart key or digital key authentication is required".

According to another embodiment, in S260, the processor 150 may output a message informing that a smart key is required as an authentication device when the authentication device is not registered in the vehicle. For example, the processor 150 may output a message saying "To keep the engine running, possession of a smart key is required".

When the message is output, the processor 150 may maintain remote startup for a remote startup state maintenance time (2 to 10 minutes) set by the user.

Although not shown, the processor 150 immediately stops remote starting without outputting a message for authentication when a start and stop button (SSB) is input by a user or a remote start stop button is input.

Figure 10:
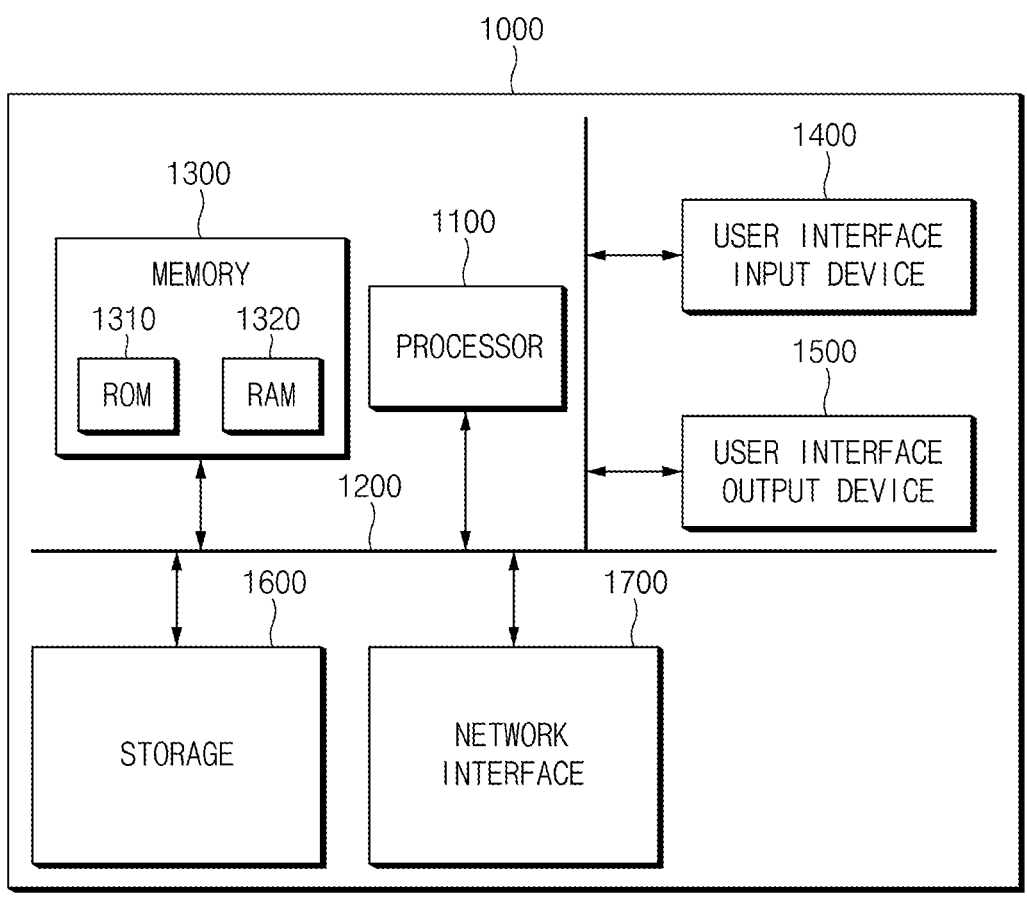
FIG. 10 is a block diagram illustrating a computing system according to an embodiment of the present disclosure.

FIG. 10 is a block diagram illustrating a computing system according to an embodiment of the present disclosure.

Referring to FIG. 10, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the apparatus and method for controlling a vehicle may prevent an unnecessary warning message requiring authentication from being output when an authentication device is found in the vehicle, so that it is possible to minimize user's inconvenience.

According to the embodiments of the present disclosure, the apparatus and method for controlling a vehicle may search for all authentication devices in the vehicle when the door state is changed while vehicle power is applied, and prevent a warning message from being output when at least one authentication device is found. In addition, the apparatus and method may output the warning message according to an authentication device used to apply power and whether the digital key is registered when any authentication devices are not found in the vehicle.

According to the embodiments of the present disclosure, the apparatus and method for controlling a vehicle may search for all authentication device in the vehicle when the door is closed or the brake is pressed in the remote start state of the vehicle and prevent a warning message from being output when at least one authentication device is found. In addition, the apparatus and method may output the guide message based on the authentication device registered in the vehicle when any authentication devices are not found in the vehicle.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle, the apparatus comprising:
   a communication device configured to communicate with an authentication device of the vehicle; and
   a processor configured to search for the authentication device inside of the vehicle, and to prevent a guide message for authentication from being output when at least one authentication device is found inside the vehicle;
   wherein the processor is further configured to output a message informing that the power is applied by using a first digital key when the authentication device is not found inside the vehicle after the first digital key is used to apply the power as the authentication device; and
   wherein the digital key performs authentication to apply power to the electric device when the first digital key is provided on a wireless charging device in the vehicle.

2. The apparatus of claim 1, wherein the processor is configured to search for the authentication device inside of the vehicle when determining that a state of a door is changed while power is applied to the vehicle, and to output the guide message according to the authentication device used to apply the power, and whether the authentication device used to apply the power is registered in the vehicle when the authentication device is not found inside the vehicle.

3. The apparatus of claim 2, wherein the processor is configured to determine that the authentication device is not found inside of the vehicle, and to output a message informing that a smart key and a second digital key are not recognized when the second digital key is registered in the vehicle, and wherein the authentication device used to apply the power includes the smart key and the second digital key.

4. The apparatus of claim 2, wherein the processor is configured to determine that the authentication device is not found inside of the vehicle, and output a message informing that the power is applied by using a fingerprint when the authentication device used to apply the power includes the fingerprint.

5. The apparatus of claim 1, wherein the processor is configured to search for the authentication device inside of the vehicle when determining a remote start state and at least one of a door closed state of the vehicle, a brake pressed state, or a combination thereof, and to output the guide message according to the authentication device registered in the vehicle when the authentication device is not found inside the vehicle.

6. The apparatus of claim 5, wherein the processor is configured to output a message informing that a smart key, the first digital key, a second digital key, or a fingerprint is required as an authentication device for maintaining engine running when it is determined that the authentication device is not found inside the vehicle, and the authentication device registered in the vehicle includes at least one of the first digital key, the second digital key or a combination thereof, and the fingerprint.

7. The apparatus of claim 5, wherein the processor is configured to output a message informing that a smart key or a fingerprint is required as the authentication device for maintaining engine running when it is determined that the authentication device is not found inside the vehicle and the authentication device registered in the vehicle includes a fingerprint.

8. The apparatus of claim 5, wherein the processor is configured to output a message informing that a smart key, the first digital key or a second digital key is required as an authentication device for maintaining engine running when it is determined that the authentication device is not found inside the vehicle, and the authentication device registered in the vehicle includes at least one of the first digital key, the second digital key or a combination thereof.

9. The apparatus of claim 5, wherein the processor is configured to output a message informing that a smart key is required as the authentication device for maintaining engine running when it is determined that the authentication device is not found inside of the vehicle and the authentication device registered in the vehicle does not exist.

10. The apparatus of claim 1, wherein the authentication device communicating with the communication device includes at least one of a smart key, the first digital key, a second digital key, or a combination thereof.

11. The apparatus of claim 10, wherein the communication device is configured to communicate with the first digital key through at least one of near field communication (NFC), Bluetooth low energy, ultra wideband (UWB) communication, or a combination thereof.

12. The apparatus of claim 10, wherein the processor is configured to determine that the second digital key is found inside of the vehicle when the second digital key is provided on a wireless charging device.

13. A method of controlling a vehicle, the method comprising:
   searching for an authentication device inside of the vehicle; and preventing a guide message for authentication from being output when at least one authentication device is found inside of the vehicle;

wherein the method further comprises:

outputting a message informing that the power is applied by using a first digital key when the authentication device is not found inside the vehicle after the first digital key is used to apply the power as the authentication device;

wherein the first digital key performs authentication to apply power to the electric device when the first digital key is provided on a wireless charging device in the vehicle.

14. The method of claim 13, further comprising:

searching for the authentication device inside of the vehicle when determining that a state of a door is changed while power is applied to the vehicle, and outputting the guide message according to the authentication device used to apply the power and whether the authentication device used to apply the power is registered in the vehicle when the authentication device is not found inside of the vehicle.

15. The method of claim 14, further comprising:

determining that the authentication device is not found inside of the vehicle, and outputting a message informing that a smart key and a second digital key are not recognized when the second digital key is registered in the vehicle, wherein the authentication device used to apply the power includes the smart key and the second digital key.

16. The method of claim 14, further comprising:

determining that the authentication device is not found inside of the vehicle, and outputting a message informing that the power is applied by using a fingerprint when the authentication device used to apply the power includes the fingerprint.

17. The method of claim 13, further comprising:

searching for the authentication device inside the vehicle when determining a remote start state and at least one of a door closed state of the vehicle, a brake pressed state, or a combination thereof, and outputting the guide message according to the authentication device registered in the vehicle when the authentication device is not found inside of the vehicle.

18. The method of claim 17, further comprising:

outputting a message informing that a smart key, the first digital key, a second digital key, or a fingerprint is required as an authentication device for maintaining engine running when it is determined that the authentication device is not found inside of the vehicle, and the authentication device registered in the vehicle includes at least one of the first digital key, the second digital key or a combination thereof, and the fingerprint.

19. The method of claim 17, further comprising:

outputting a message informing that a smart key or a fingerprint is required as the authentication device for maintaining engine running when it is determined that the authentication device is not found inside of the vehicle and the authentication device registered in the vehicle includes a fingerprint.

20. The method of claim 17, further comprising:

outputting a message informing that a smart key, the first digital key or a second digital key is required as an authentication device for maintaining engine running when it is determined that the authentication device is not found inside of the vehicle, and the authentication device registered in the vehicle includes at least one of the first digital key, the second digital key or a combination thereof.

* * * * *